(12) United States Patent
Kim et al.

(10) Patent No.: US 10,788,719 B2
(45) Date of Patent: Sep. 29, 2020

(54) LIQUID CRYSTAL DISPLAY DEVICE

(71) Applicant: Samsung Display Co. Ltd., Yongin-si (KR)

(72) Inventors: Won Ho Kim, Seongnam-si (KR); Sung Man Kim, Seongnam-si (KR); Min Chul Song, Suwon-si (KR); Hwa Yeul Oh, Suwon-si (KR); Yeon Mun Jeon, Hwaseong-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 347 days.

(21) Appl. No.: 15/207,586

(22) Filed: Jul. 12, 2016

(65) Prior Publication Data

US 2017/0192312 A1   Jul. 6, 2017

(30) Foreign Application Priority Data

Dec. 31, 2015  (KR) .................. 10-2015-0191111

(51) Int. Cl.
| | | |
|---|---|---|
| *G02F 1/1343* | (2006.01) | |
| *G02F 1/1362* | (2006.01) | |
| *G02F 1/1333* | (2006.01) | |
| *G02F 1/1335* | (2006.01) | |
| *G02F 1/1368* | (2006.01) | |

(52) U.S. Cl.
CPC ...... *G02F 1/134309* (2013.01); *G02F 1/1368* (2013.01); *G02F 1/133345* (2013.01); *G02F 1/133512* (2013.01); *G02F 1/136286* (2013.01); *G02F 2201/121* (2013.01); *G02F 2201/123* (2013.01)

(58) Field of Classification Search
CPC ......... G02F 1/134309; G02F 1/136286; G02F 1/1368; G02F 1/134363; G02F 2001/134372; G02F 2201/121; G02F 2201/123; G02F 2201/124; G09G 3/3614; G09G 3/3659; G09G 2300/0823; G09G 2310/0262
See application file for complete search history.

(56) References Cited

U.S. PATENT DOCUMENTS

| | | | | |
|---|---|---|---|---|
| 2011/0102309 | A1* | 5/2011 | Cho ..................... | G09G 3/3648 345/92 |
| 2013/0088668 | A1* | 4/2013 | Seo ................... | G02F 1/133784 349/96 |
| 2014/0168555 | A1* | 6/2014 | Um ....................... | G02F 1/1343 349/43 |
| 2017/0168354 | A1* | 6/2017 | Jiang ................. | G02F 1/133512 |

FOREIGN PATENT DOCUMENTS

KR   1020100005883   1/2010

* cited by examiner

*Primary Examiner* — Angela K Davison
(74) *Attorney, Agent, or Firm* — Cantor Colburn LLP

(57) ABSTRACT

A liquid crystal display device includes first to fourth pixel electrodes neighbored each other in a first direction, a common electrode at least partially overlapping the first to fourth pixel electrodes, and a first data line and a second data line extended in a second direction different from the first direction, and neighbored each other where the first data line is interposed between the first pixel electrode and the second pixel electrode, the second data line is interposed between the third pixel electrode and the fourth pixel electrode, and at least one slit defined in the common electrode is interposed between the second pixel electrode and the third pixel electrode.

25 Claims, 18 Drawing Sheets

(a)

(b)

US 10,788,719 B2

LIQUID CRYSTAL DISPLAY DEVICE

This application claims priority to Korean Patent Application No. 10-2015-0191111, filed on Dec. 31, 2015, and all the benefits accruing therefrom under 35 U.S.C. § 119, the content of which in its entirety is herein incorporated by reference.

BACKGROUND

1. Field

Exemplary embodiments of the invention relate to a liquid crystal display device.

2. Description of the Related Art

An importance of display devices is increasing along with a development of multimedia. Accordingly, various kinds of display devices such as a liquid crystal display ("LCD") and an organic light emitting display ("OLED") are being used.

An LCD device is one of the currently most widely used flat panel display devices, and generally includes two substrates on which electric field generating electrodes, such as pixel electrodes and a common electrode, are formed, and a liquid crystal layer interposed between the two substrates. The LCD device applies voltages to the electric field generating electrodes so as to generate an electric field in the liquid crystal layer, which determines the alignment direction of liquid crystal molecules in the liquid crystal layer to control polarization of incident light, thereby displaying desired images.

SUMMARY

In a liquid crystal display device ("LCD"), when a spacing distance between neighboring pixel electrodes is short, transmittance may increase but color mixture defects may also increase. On the contrary, when a spacing distance between neighboring pixel electrodes is long, color mixture defects may decrease but transmittance may also decrease.

An exemplary embodiment of the invention provides an LCD device in which color mixture defects are prevented even when a spacing distance between pixel electrodes is decreased.

Another exemplary embodiment of the invention provides an LCD device with improved transmittance.

Another exemplary embodiment of the invention provides an LCD device in which light leakage caused by a coupling phenomenon between data lines and pixel electrodes is prevented.

However, exemplary embodiments of the invention are not restricted to those set forth herein. The other exemplary embodiments of the invention which are not mentioned herein will become more apparent to a person skilled in the art to which the invention pertains by referencing the detailed description of the invention given below.

According to an exemplary embodiment of the invention, there is provided an LCD device in which at least one slit is defined in a common electrode, thereby preventing color mixture defects.

According to another exemplary embodiment of the invention, there is provided an LCD device in which a spacing distance between pixel electrodes is decreased to achieve improved transmittance.

According to another exemplary embodiment of the invention, there is provided an LCD device in which a slit of a common electrode is defined in a region non-overlapping data lines, thereby preventing light leakage caused by a coupling phenomenon between the data lines and pixel electrodes.

An exemplary embodiment of the invention discloses an LCD device including first to fourth pixel electrodes neighbored each other in a first direction, a common electrode at least partially overlapping the first to fourth pixel electrodes, and a first data line and a second data line extended in a second direction different from the first direction, and neighbored each other. The first data line may be interposed between the first pixel electrode and the second pixel electrode, and the second data line is interposed between the third pixel electrode and the fourth pixel electrode, and at least one slit interposed between the second pixel electrode and the third pixel electrode may be defined in the common electrode.

An exemplary embodiment of the invention also discloses an LCD device including a first data line and a second data line neighbored each other on a lower substrate, first to fourth pixel electrodes neighbored each other on the first data line and the second data line, and a common electrode which at least partially overlaps the first to fourth pixel electrodes, and in which at least one slit is defined. The first data line may overlap a first region between the first pixel electrode and the second pixel electrode, and the second data line overlaps with a second region between the third pixel electrode and the fourth pixel electrode, and the at least one slit may overlap a third region between the second pixel electrode and the third pixel electrode.

An exemplary embodiment of the invention also discloses an LCD device including first to fourth pixel electrodes neighbored each other in a first direction, at least one slit interposed between the second pixel electrode and the third pixel electrode is defined in a common electrode, and a first data line and a second data line extended in a second direction different from the first direction, and disposed adjacent to each other. The first data line may be interposed between the first pixel electrode and the second pixel electrode and connected respectively to the first pixel electrode and the second pixel electrode, and the second data line is interposed between the third pixel electrode and the fourth pixel electrode and connected respectively to the third pixel electrode and the fourth pixel electrode, and no data line may be disposed between the second pixel electrode and the third pixel electrode.

BRIEF DESCRIPTION OF THE DRAWINGS

The accompanying drawings, which are included to provide a further understanding of the invention, and are incorporated in and constitute a part of this specification, illustrate exemplary embodiments of the invention, and, together with the description, serve to explain principles of the invention.

DETAILED DESCRIPTION

Figure 1:
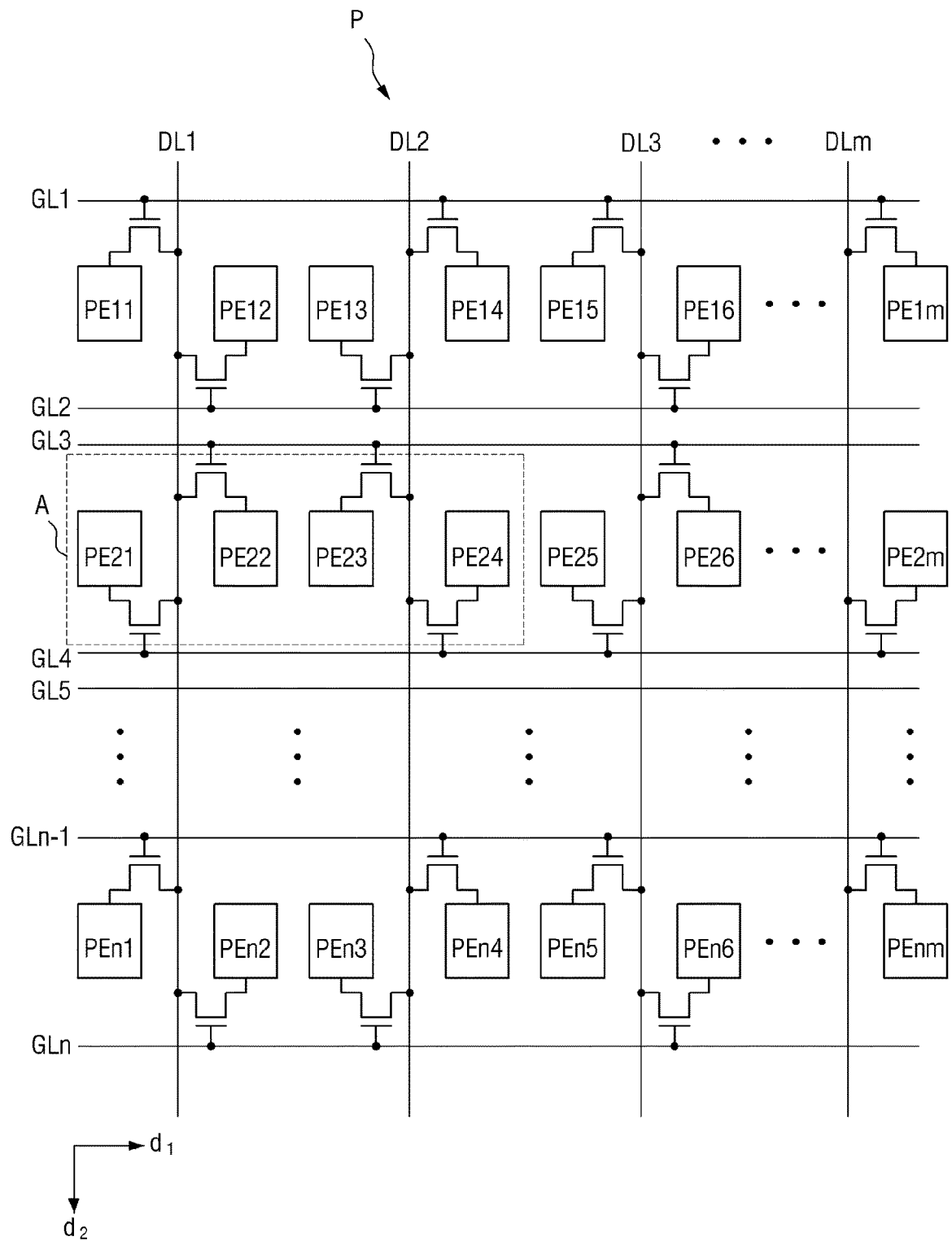
FIG. 1 schematically illustrates an exemplary embodiment of a display panel of a liquid crystal display ("LCD") device according to the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described with reference to the accompanying drawings.

Figure 2:
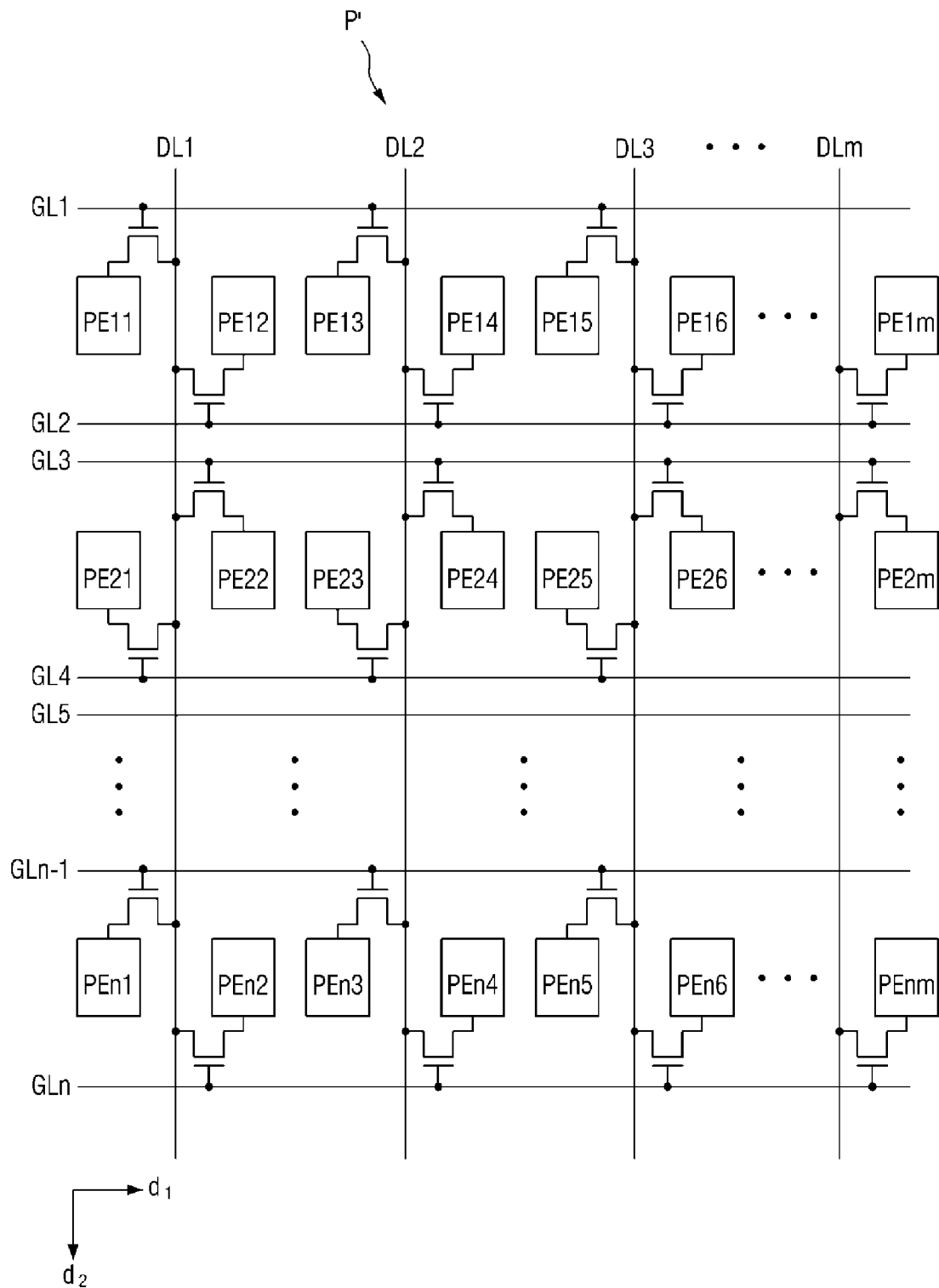
FIG. 2 schematically illustrates another exemplary embodiment of a display panel of an LCD device according to the invention.
Figure 3:
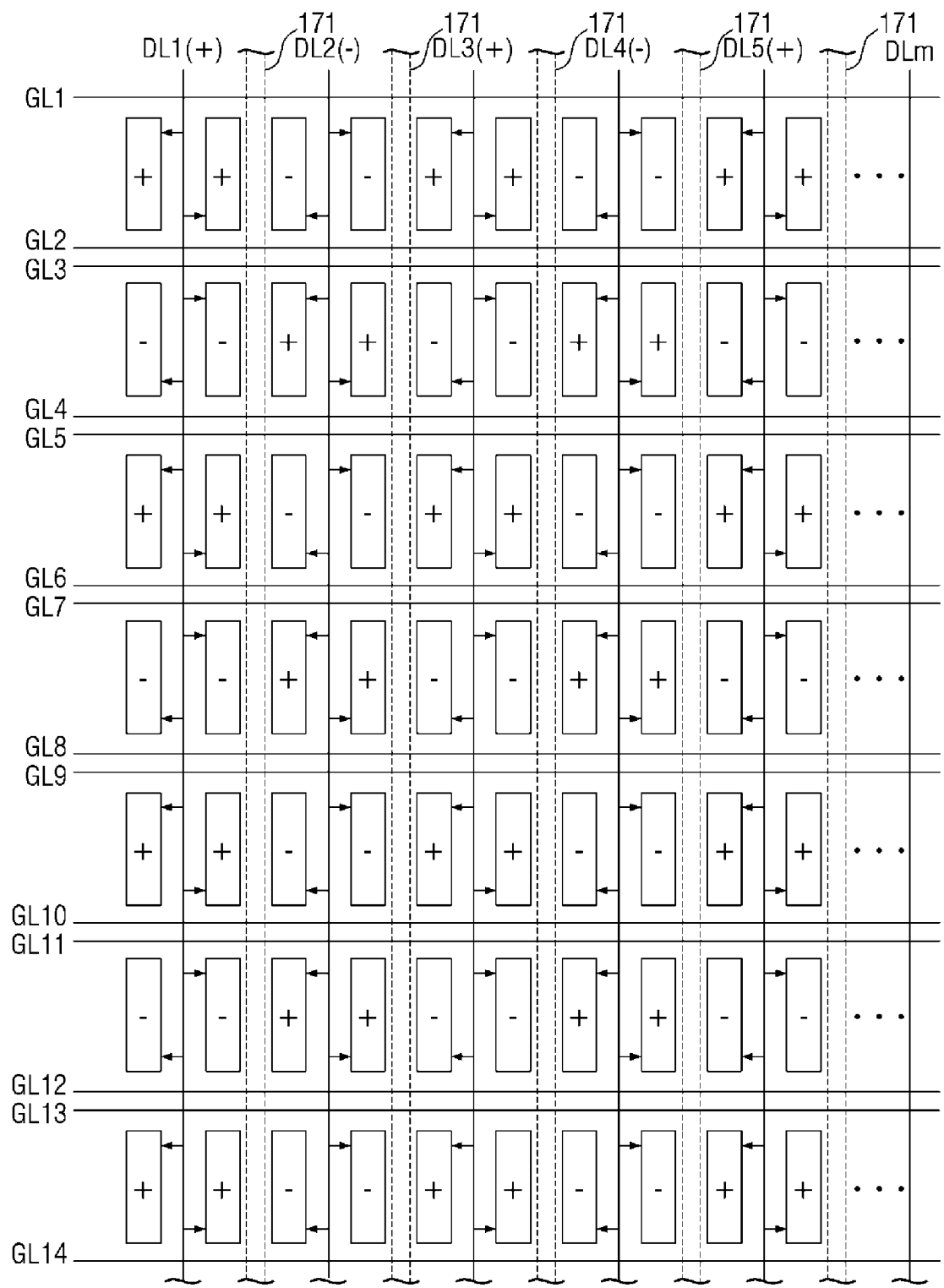
FIG. 3 illustrates the display panel of FIG. 1, in which a slit is defined.

FIG. 1 schematically illustrates a display panel P of a liquid crystal display ("LCD") device according to an exemplary embodiment of the invention. FIG. 2 schematically illustrates a display panel P' of an LCD device according to another exemplary embodiment of the invention. FIG. 3 illustrates the display panel of FIG. 1, in which a slit is added.

Referring first to FIG. 1, a plurality of gate lines GL1 to GLn may extend in a first direction d1, and a plurality of data lines DL1 to DLm may extend in a second direction d2 different from the first direction d1, where n and m are natural numbers greater than 1. The first direction d1 and the second direction d2 may intersect each other in a perpendicular direction. Hereinafter, the first direction d1 will be also referred to as a column direction, and the second direction d2 will be also referred to as a row line.

The plurality of gate lines GL1 to GLn may be insulated from the plurality of data lines DL1 to DLm. The plurality of gate lines GL1 to GLn may be connected to a gate driving unit (not shown in the drawings) so as to receive respectively a plurality of gate signals from the gate driving unit. The plurality of data lines DL1 to DLm may be connected to a data driving unit (not shown) so as to receive respectively a plurality of data signals from the data driving unit.

The display panel P may display an image. The display panel P may be connected to the plurality of gate lines GL1 to GLn and the plurality of data lines DL1 to DLm. More specifically, the display panel P may include a plurality of pixel electrodes PE11 to PEnm, and a plurality of switching elements connected respectively to the pixel electrodes PE11 to PEnm. Each of the pixel electrodes PE11 to PEnm may be connected to the gate lines and the data lines through the plurality of switching elements. The switching elements may be turned on when gate signals are received from the gate lines connected thereto, and receive data signals from the data lines connected thereto and provide the received data signals to the pixel electrodes.

The display panel P of the LCD device according to an exemplary embodiment of the invention may have two pixel electrodes PEs neighboring each other and sharing one data line. In an exemplary embodiment, the pixel electrode PE11 connected to the first gate line GL1 may share the first data line DL1 with the pixel electrode PE12 connected to the second gate line GL2, for example. Furthermore, the pixel electrode PE13 connected to the second gate line GL2 may share the second data line DL2 with the pixel electrode PE14 connected to the first gate line GL1. Hereinafter, the expression "neighboring each other" as used herein means that two components are consecutively disposed one after the other. In an exemplary embodiment, the expression "the first and second data lines DL1 and DL2 neighboring each other" means that no separate data line is interposed between the first and second data lines DL1 and DL2.

When two pixel electrodes neighboring each other in the same direction share one data line therebetween, the two pixel electrodes may be connected to gate lines different from each other. In an exemplary embodiment, two pixel electrodes PE11 and PE12 sharing the first data line DL1 may be connected respectively to gate lines GL1 and GL2 different from each other, for example. However, the connection structure of pixel electrodes PE11 and PE12 and gate lines GL1 and GL2 is not limited to those shown in FIG. 1, and the pixel electrode PE14 may be connected to the second gate line GL2 and the other pixel electrode PE13 may be connected to the first gate line GL1 as shown in FIG. 2. That is, as shown in FIG. 2, the display panel P' of the LCD device according to another exemplary embodiment of the invention differs from the display panel P of the LCD device according to an exemplary embodiment of the invention with respect to the connection structure between the gate line and two pixel electrodes neighboring in the first direction d1 and sharing one data line. Hereinafter, the display panel P of the LCD device according to an exemplary embodiment of the invention shown in FIG. 1 will be described.

Referring to FIGS. 1 and 3, a slit 171 of a common electrode 170 (refer to FIG. 6) may be interposed between two pixel electrodes neighboring each other but not sharing a data line. In an exemplary embodiment, the slit 171 of the common electrode 170 may be interposed between the pixel electrode PE12 which receives a data signal from the first data line DL1 and the pixel electrode PE13 which receives a data signal from the second data line DL2. The slit 171 of the common electrode 170 is illustrated by dot lines in FIG. 3 in order to show the location of the slit 171, and the shape or size of the slit 171 is not necessarily limited to those shown in FIG. 3.

That is, the slit 171 of the common electrode 170 may be defined so as not to overlap the plurality of data lines DL1 to DLm. More specifically, the slit 171 of the common electrode 170 may extend in the second direction d2 same as the direction of the plurality of data lines DL1 to DLm, and may be defined in a region in which the plurality of data lines DL1 to DLm are not disposed.

Data signals having different polarities may be applied to data lines neighboring each other. In an exemplary embodiment, when a data signal having a first polarity (+) is applied to the first data line DL1, a data signal having a second polarity (−) different from the first polarity (+) may be applied to the second data line DL2. In this case, the data signal having a second polarity (−) may have a phase opposite to the phase of the data signal having a first polarity (+). Resultantly, data signals having different polarities may be applied to two pixel electrodes neighboring each other in the first direction d1, pixel electrodes which receive data signals having the same polarity may be distributed uniformly in the display panel P.

The slit 171 of the common electrode 170 may be plural in number, and as an exemplary embodiment, at least one slit 171 may be disposed in a region between two neighboring pixel electrodes in which the plurality of data lines DL1 to DLm are not disposed. That is, the slit 171 of the common electrode 170 may be defined in all of the regions between two neighboring pixel electrodes in which the plurality of data lines DL1 to DLm are not disposed, or alternatively, the slit 171 may be omitted in a part of the regions.

Figure 4:
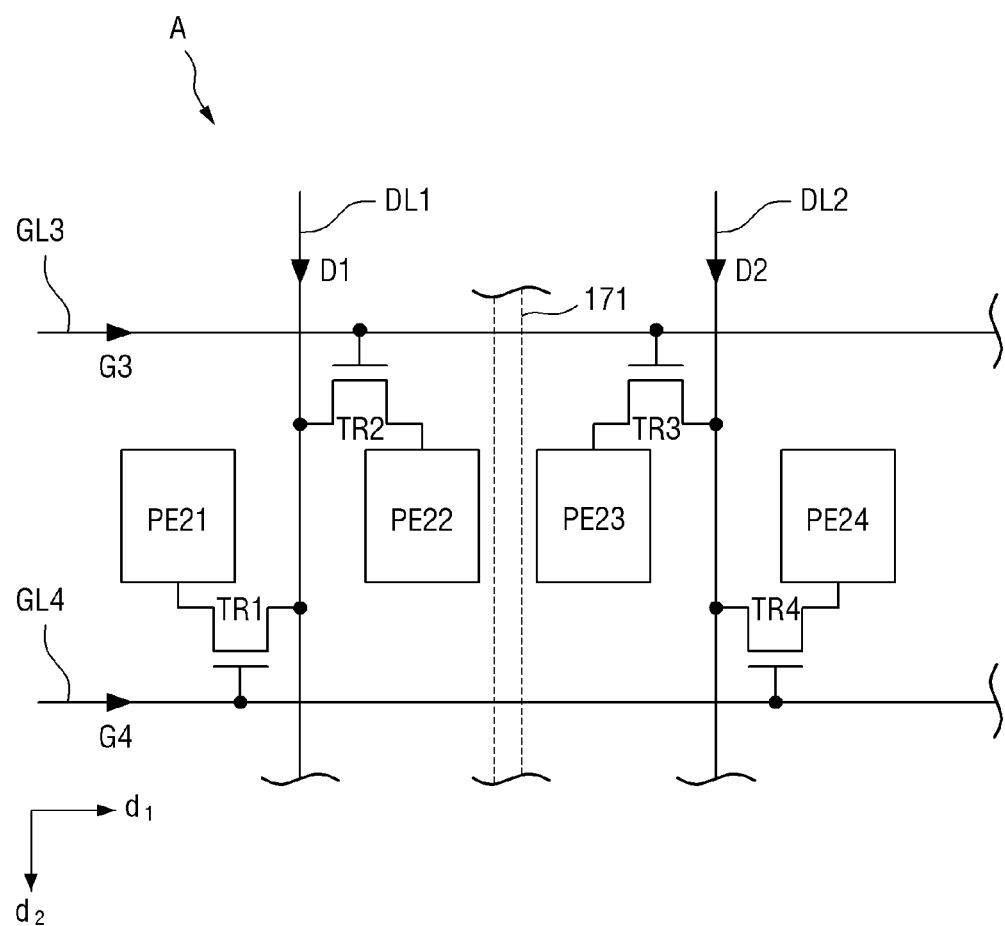
FIG. 4 is a circuit diagram illustrating the details of first to fourth pixels of A region shown in FIG. 1.

FIG. 4 is a circuit diagram illustrating the details of first to fourth pixels of A region shown in FIG. 1.

The first to fourth pixels will be described in detail with reference to FIG. 4. The first to fourth pixel electrodes PE21 to PE24 may be disposed neighboring to each other in the first direction d1. A first data line DL1 may be interposed between the first and second pixel electrodes PE21 and PE22, and a second data line DL2 may be interposed between the third and fourth pixel electrodes PE23 and PE24. Hereinafter, enabling the first data line DL1 and the second data line DL2 to be disposed neighboring to each other may mean that no data line is interposed between the second and third pixel electrodes PE22 and PE23. The first to fourth pixel electrodes PE21 to PE24 may be interposed between an first gate line GL1 and an second gate line GL2.

The LCD device according to an exemplary embodiment of the invention may further include first to fourth switching elements TR1 to TR4. As an exemplary embodiment, the first to fourth switching elements TR1 to TR4 may be tri-terminal elements such as thin film transistors ("TFTs"). A description will hereinafter be made on the exemplary embodiment in which the first to fourth switching elements TR1 to TR4 are TFTs. As an exemplary embodiment, each of the first to fourth switching elements TR1 to TR4 may have one electrode which is a source electrode and the other electrode which is a drain electrode.

The first switching element TR1 may include a gate electrode connected to the second gate line GL2, one electrode connected to the first data line DL1, and the other electrode connected to the first pixel electrode PE21. The first switching element TR1 may provide the first data signal D1 provided from the first data line DL1 to the first pixel electrode PE21 according to the second gate signal G2 provided from the second gate line GL2. The second switching element TR2 may include a gate electrode connected to the first gate line GL1, one electrode connected to the first data line DL1, and the other electrode connected to the second pixel electrode PE22. The second switching element TR2 may provide the first data signal D1 provided from the first data line DL1 to the second pixel electrode PE22 according to the first gate signal G1 provided from the first gate line GL1.

That is, one electrode of each of the first and second switching elements TR1 and TR2 may be connected to the first data line DL1 so as to share the first data line DL1. As described above, the connection structure between the gate line and the first and second switching elements TR1 and TR2, each of which is connected to the first data line DL1, is not necessarily limited to those shown in FIG. 1. That is, the gate electrode of the first switching element TR1 may be connected to the first gate line GL1, and the gate electrode of the second switching element TR2 may be connected to the second gate line GL2.

The third switching element TR3 may include a gate electrode connected to the first gate line GL1, one electrode connected to the second data line DL2, and the other electrode connected to the third pixel electrode PE23. The third switching element TR3 may provide the second data signal D2 provided from the second data line DL2 to the third pixel electrode PE23 according to the first gate signal G1 provided from the first gate line GL1. The fourth switching element TR4 may include a gate electrode connected to the second gate line GL2, one electrode connected to the second data line DL2, and the other electrode connected to the fourth pixel electrode PE24. The fourth switching element TR4 may provide the second data signal D2 provided from the second data line DL2 to the fourth pixel electrode PE24 according to the second gate signal G2 provided from the second gate line GL2.

That is, one electrode of each of the third and fourth switching elements TR3 and TR4 may be connected to the second data line DL2. As in the first and second switching elements TR1 and TR2, the connection structure between the gate electrode of each of the third and fourth switching elements TR3 and TR4 and the gate line is not necessarily limited to those shown in FIG. 1.

The LCD device according to an exemplary embodiment of the invention may further include the common electrode 170 (refer to FIG. 6) at least partially overlapping the first to fourth pixel electrodes PE21 to PE24. The common electrode 170 may receive a common voltage applied thereto from a separate common line (not shown in the drawings). The common electrode 170 may at least partially overlap the first to fourth pixel electrodes PE21 to PE24. Similarly, the LCD device according to an exemplary embodiment of the invention may further include second to fourth liquid crystal capacitors interposed respectively between the second to fourth pixel electrodes PE22 to PE24 and the common electrode 170.

As an exemplary embodiment, at least one slit 171 (refer to FIG. 4) interposed between the second pixel electrode PE22 and the third pixel electrodes PE23 may be defined in the common electrode 170. This will be described later with reference to FIG. 4. The first to fourth pixel electrodes PE21 to PE24 shown in FIG. 4 will be denoted by reference numerals 180a to 180d in FIGS. 5 to 13.

Figure 5:
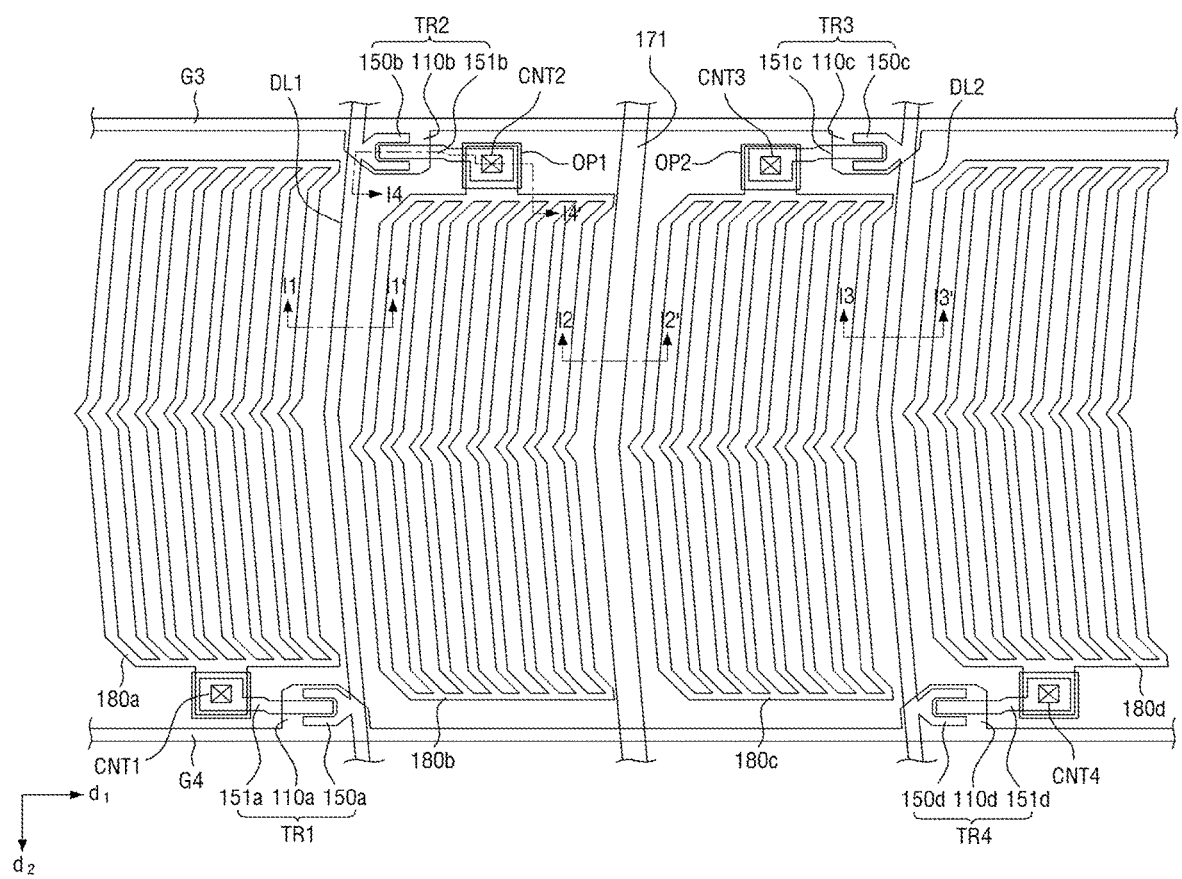
FIG. 5 is a plan view illustrating in detail one embodiment of first to fourth pixels of the display panel shown in FIG. 4.
Figure 6:
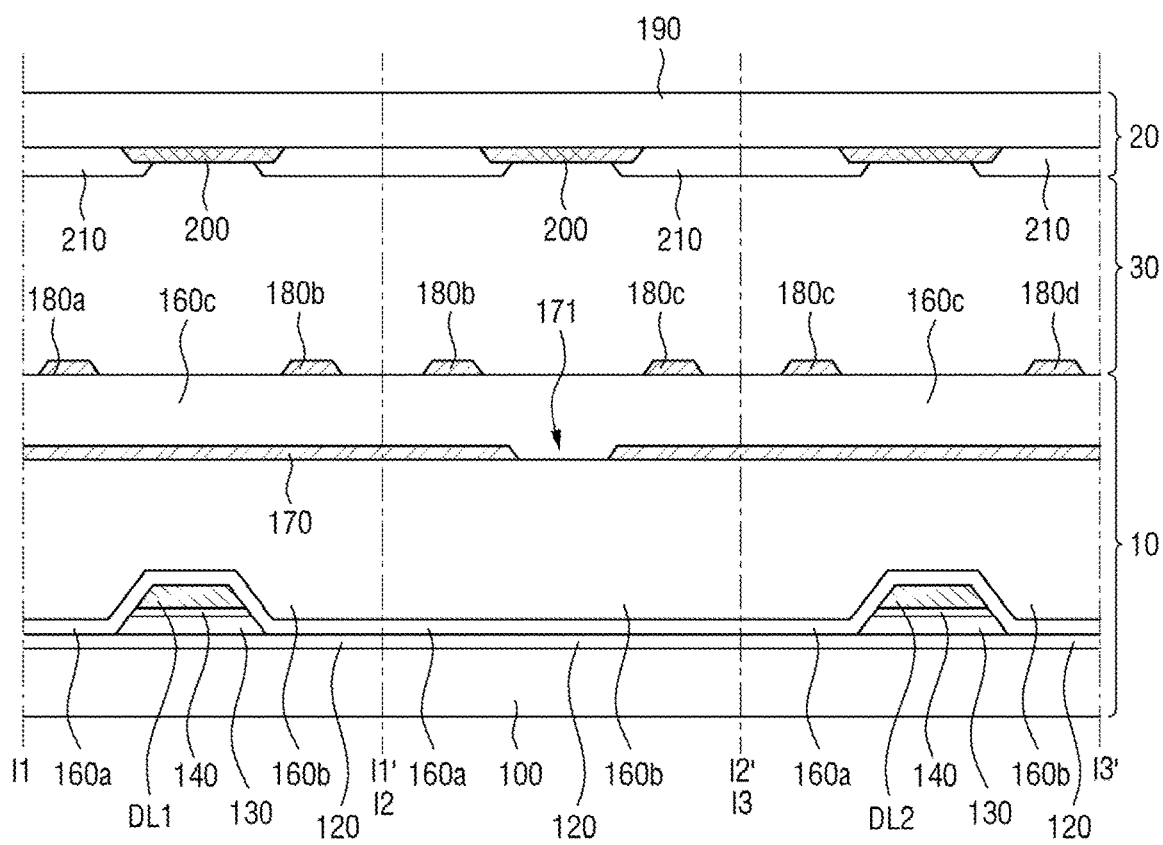
FIG. 6 is a cross sectional view taken along lines I1-I1', I2-I2' and I3-I3' of the plan view of FIG. 5.
Figure 7:
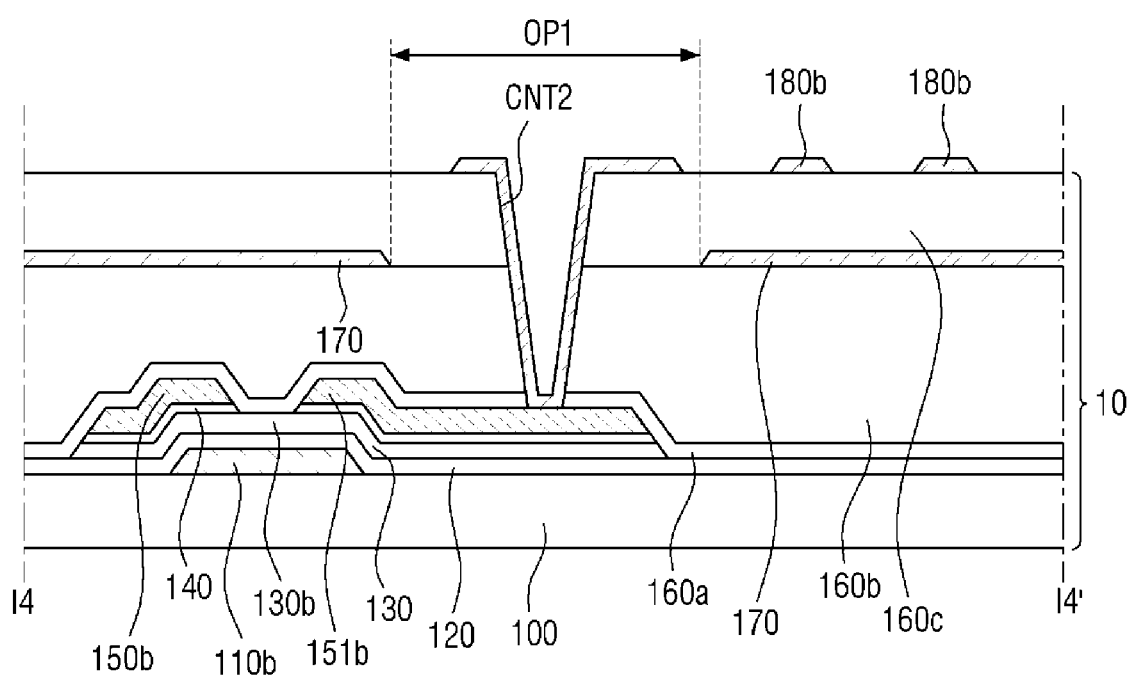
FIG. 7 is a cross sectional view taken along line I4-I4' of the plan view of FIG. 5.

FIG. 5 is a plan view illustrating in detail a part of components of the display panel shown in FIG. 4. FIG. 6 is a cross sectional view taken along lines I1-I1', I2-I2' and I3-I3' of the plan view of FIG. 5. FIG. 7 is a cross sectional view taken along line I4-I4' of the plan view of FIG. 5. The line I1-I1' is used to illustrate the first and second pixel electrodes 180a and 180b and the first data line DL1 interposed therebetween, and the line I2-I2' is used to illustrate the second and third pixel electrodes 180b and 180c and at least one slit 171 interposed therebetween. In addition, the line I3-I3' is used to illustrate the third and fourth pixel electrodes 180c and 180d and the second data line DL2 interposed therebetween. FIG. 7 illustrates a lower display plate 10.

Referring now to FIG. 5, the slit 171 may be defined in the common electrode 170. As an exemplary embodiment, the slit 171 may be defined in the second direction d2 between the second pixel electrode PE22 and the third pixel electrode PE23. As described above, the first data line DL1 may be interposed between the first pixel electrode PE21 and the second pixel electrode PE22, and the second data line DL2 may be interposed between the third pixel electrode PE23 and the fourth pixel electrode PE24 (refer to FIG. 4). Thus, no data line is interposed between the second pixel electrode PE22 and the third pixel electrode PE23. The slit 171 of the common electrode 170 may be defined in a region in which no data line is disposed.

Furthermore, the slit 171 may not overlap the first data line DL1 and the second data line DL2 and other data lines not shown in FIG. 4. That is, the slit 171 may extend in the second direction d2 along which the plurality of data lines DL1 to DLm (refer to FIG. 1) extend.

The connection structure between the second switching element TR2 and the second pixel electrode 180b connected thereto will be described as a representative of the connection structures between the switching elements TR1 to TR4 and the pixel electrodes 180a to 180d connected respectively thereto.

Referring to FIGS. 5 to 7, the LCD device according to an exemplary embodiment of the invention may include a lower display plate 10, an upper display plate 20 and a liquid crystal layer 30 interposed therebetween. The lower display plate 10 may face the upper display plate 20. As an exemplary embodiment, the lower display plate 10 may be sealed to the upper display plate 20.

The lower display plate 10 will hereinafter be described.

As an exemplary embodiment, a lower substrate 100 may be a transparent glass substrate, a plastic substrate and the like, and may be an array substrate on which a plurality of switching elements are disposed.

The first gate line GL1, the second gate line GL2, and first to fourth gate electrodes 110a to 110d may be disposed on the lower substrate 100. The first gate line GL1 and the second gate line GL2 may extend in the first direction d1 so as to be disposed on the lower substrate 100. The first and fourth gate electrodes 110a and 110d may be connected to the second gate line GL2. The second and third gate electrodes 110b and 110c may be connected to the first gate line GL1. The first gate line GL1, the second gate line GL2, and the first to fourth gate electrodes 110a to 110d may include a single layer, a double layer including at least two, or a triple layer including at least three selected from conductive metals including aluminum (Al), copper (Cu), molybdenum (Mo), chrome (Cr), titanium (Ti), tungsten (W), moly-tungsten(MoW), moly-titanium (MoTi) and copper/moly-titanium (Cu/MoTi), for example.

A gate insulation layer 120 may be disposed on the first gate line GL1, the second gate line GL2, and the first to fourth gate electrodes 110a to 110d. As an exemplary embodiment, the gate insulation layer 120 may include silicon nitride (SiNx), silicon oxide (SiOx) or the like, for example. The gate insulation layer 120 may have a multi-layer structure including at least two insulation layers having different physical properties.

A semiconductor layer 130 may be disposed on the gate insulation layer 120. As an exemplary embodiment, the semiconductor layer 130 may include amorphous silicon, polycrystalline silicon or the like. As another exemplary embodiment, the semiconductor layer 130 may include at least one of oxide semiconductors including In—Ga-Zinc-Oxide ("IGZO"), ZnO, ZnO2, CdO, SrO, SrO2, CaO, CaO2, MgO, MgO2, InO, In2O2, GaO, Ga2O, Ga2O3, SnO, SnO2, GeO, GeO2, PbO, Pb2O3, Pb3O4, TiO, TiO2, Ti2O3 and Ti3O5, for example.

The semiconductor layer 130 may at least partially overlap the first data line DL1 and the second data line DL2. Furthermore, as an exemplary embodiment, when a plurality of data lines, first to fourth source electrodes 150a to 150d, first to fourth drain electrodes 151a to 151d and the semiconductor layer 130 are provided together through a single mask process, the semiconductor layer 130 may be provided beneath the plurality of data lines, the first to fourth source electrodes 150a to 150d, and the first to fourth drain electrodes 151a to 151d. That is, the semiconductor layer 130 may have a shape substantially the same as those of the plurality of data lines, except in a channel region thereof.

The semiconductor layer 130 may include a second semiconductor pattern 130b which forms the second switching element TR2. The second semiconductor pattern 130b may at least partially overlap the second gate electrode 110b.

An ohmic contact layer 140 may be disposed on the semiconductor layer 130. In an exemplary embodiment, the ohmic contact layer 140 may include n+ hydrated amorphous silicon or the like, which is highly doped with n-type impurities such as phosphorus, or including silicide. The ohmic contact layer 140 may be omitted when the semiconductor layer 130 includes an oxide semiconductor.

Although the second switching element TR2 is described above as a representative, the semiconductor layer 130 may further include semiconductor patterns for forming respectively the first, the third and the fourth switching elements TR1, TR3 and TR4 like the second semiconductor pattern 130b.

The first data line DL1, the second data line DL2, the second source electrode 150b and the second drain electrode 151b may be disposed on the ohmic contact layer 140. That is, as an exemplary embodiment, the first data line DL1 and the second data line DL2 may be disposed in the same layer as the second source electrode 150b and the second drain electrode 151b, and may be provided through the same mask process. The first data line DL1, the second data line DL2, the second source electrode 150b and the second drain electrode 151b may include a single layer, a double layer including at least two, or a triple layer including at least three selected from conductive metals including aluminum (Al), copper (Cu), molybdenum (Mo), chrome (Cr), titanium (Ti), tungsten (W), moly-tungsten (MoW), moly-titanium (MoTi) and copper/moly-titanium (Cu/MoTi). However, the invention is not limited thereto, and the first data line DL1, the second data line DL2, the second source electrode 150b and the second drain electrode 151b may include various metals or conductors. The second source electrode 150b may be connected to the first data line DL1, and the second drain electrode 151b may be electrically connected to the second pixel electrode 180b through a second contact hole CNT2. The second source electrode 150b and the second drain electrode 151b may at least partially overlap the second gate electrode 110b, and spaced apart from each other by a predetermined distance on the same layer.

Thus, the second switching element TR2 may include the second gate electrode 110b, the second semiconductor pattern 130b, the second source electrode 150b and the second drain electrode 151b. The second switching element TR2 may receive a data signal from the first data line DL1 through the second source electrode 150b, and provide the received data signal to the second pixel electrode 180b through the second drain electrode 151b and the second contact hole CNT2. However, the second switching element TR2 is described as a representative herein, the first, the third and the fourth switching elements TR1, TR3 and TR4 may have substantially the same structure as that of the second switching element TR2, since the first, the third and the fourth switching elements TR1, TR3 and TR4 are provided through a process same as that of the second switching element TR2.

A first passivation layer 160a may be disposed on the gate insulation layer 120 including the second source electrode 150b and the second drain electrode 151b. In an exemplary embodiment, the first passivation layer 160a may include an inorganic insulation material such as silicon nitride, silicon oxide and the like.

An organic insulation layer 160b may be disposed on the first passivation layer 160a so as to expose at least a part of the second drain electrode 151b. The organic insulation layer 160b may include a photosensitive material, which eliminates the necessity of using a separate photoresist during patterning of the organic insulation layer 160b such as a formation of the second contact hole CNT2, thereby improving process efficiency.

The common electrode 170 may be disposed on the organic insulation layer 160b. The common electrode 170 may at least partially overlap the first to fourth pixel electrodes 180a to 180d. The common electrode 170 may cooperate with each of the first to fourth pixel electrodes 180a to 180d so as to generate an electric field, which adjusts the alignment direction of liquid crystal molecules interposed between the lower display plate 10 and the upper display plate 20. In an exemplary embodiment, the common electrode 170 may include a transparent conductive material such as indium tin oxide ("ITO"), indium zinc oxide ("IZO") and the like.

A first opening OP1 may be defined in the common electrode so as to avoid short circuit from the second pixel electrode 180b. The first opening OP1 may overlap the second contact hole CNT2, and may have a width wider than the width of the second contact hole CNT2 along the first direction d1. Furthermore, a second opening OP2 may be defined in the common electrode 170 so as to avoid short circuit from the third pixel electrode 180c. Although the first and second openings OP1 and OP2 of the common electrode 170 are described herein, a plurality of openings may be further defined in the common electrode 170 to avoid short circuit from other pixel electrodes.

At least one slit 171 may be defined in the common electrode 170. As described above, at least one slit 171 may be defined so as not to overlap a data line on the lower substrate 100. That is, the second pixel electrode 180b may be connected to the first data line DL1 through the second switching element TR2, and the third pixel electrode 180c may be connected to the second data line DL2 through the third switching element TR3, thereby no data line is interposed between the second pixel electrode 180b and the third pixel electrode 180c. At least one slit 171 may be defined in the region in which no data line is disposed.

In the LCD device according to an exemplary embodiment of the invention, the slit 171 is defined in the common electrode 170, thus preventing an electric field from being generated between the common electrode 170 and the second and third pixel electrodes 180b and 180c disposed at both sides of the slit 171. Thus, the liquid crystal molecules in the region in which no electric field is generated rotate less or substantially no liquid crystal molecules may exist in the region, thereby reducing transmission of light. Thus, color mixture defects may not occur even when a spacing distance between pixel electrodes is decreased.

In the LCD device according to an exemplary embodiment of the invention, color mixture defects may not occur even when a spacing distance between pixel electrodes is decreased, and thus transmittance may be improved by decreasing the spacing distance. Furthermore, in the LCD device according to an exemplary embodiment of the invention, the slit 171 may be defined between the second pixel electrode 180b and the third pixel electrode 180c, that is, in the region which does not overlap the data line, thereby preventing light leakage caused by a fringe field between the data line and the pixel electrodes.

The shape, the cross-sectional structure, the number and the like of the slit 171 of the common electrode 170 are not limited as long as the slit 171 is defined in the region in which no data line is disposed. As an exemplary embodiment, the slit 171 may be disposed in parallel to the first data line DL1 and the second data line DL2. As another exemplary embodiment, the slit 171 may have a width wider than that of the data line and narrower than that of a black matrix 200 (refer to FIG. 6). As another exemplary embodiment, the slit 171 may be bent. When the first data line DL1 and the second data line DL2 are bent, the slit 171 may have a bent structure similar to the bent structure of the first data line DL1 and the second data line DL2. Thus, a length, a width or the like of the first data line DL1 and the second data line DL2 in the extending direction may be adjusted to select a length, a shape, a width or the like of the slit 171. Furthermore, the slit 171 may overlap the first gate line GL1 and the second gate line GL2, but the invention is not limited thereto. That is, the slit 171 may be interposed between the first gate line GL1 and the second gate line GL2. In an alternative exemplary embodiment, the number of the slit 171 is not necessarily limited to one. This will be described later with reference to FIGS. 8 and 10.

A second passivation layer 160c may be disposed on the common electrode 170. In an exemplary embodiment, the second passivation layer 160c may include an inorganic insulation material such as silicon nitride, silicon oxide and the like.

The first to fourth pixel electrodes 180a to 180d may be disposed on the second passivation layer 160c. In an exemplary embodiment, the first to fourth pixel electrodes 180a to 180d may include a transparent conductive material such as ITO, IZO and the like. The first to fourth pixel electrodes 180a to 180d may overlap at least a part of the common electrode 170. That is, the first to fourth pixel electrodes 180a to 180d may overlap at least a part of the common electrode 170 in a vertical direction on the lower substrate 100 so as to generate a horizontal electric field. The first to fourth pixel electrodes 180a to 180d and the common electrode 170 may be insulated by the second passivation layer 160c. The second pixel electrode 180b may be electrically connected to the second drain electrode 151b of the second switching element TR2 through the second contact hole CNT2.

A slit may be defined in each of the first to fourth pixel electrodes 180a to 180d. The slit may generate a fringe field between the first to fourth pixel electrodes 180a to 180d and the common electrode 170 so as to enable liquid crystals to rotate in a certain direction. Referring to FIG. 4, as an exemplary embodiment, the slit of each of the first to fourth pixel electrodes 180a to 180d may extend in the direction substantially the same as the direction in which the first data line DL1 and the second data line DL2 extend, and may be bent with an obtuse angle at a center thereof. Upper and lower parts of the first to fourth pixel electrodes 180a to 180d may be divided into different domains with reference to the bent part of the slit. The shape of the slits and the domains of the first to fourth pixel electrodes 180a to 180d are not necessarily limited to those shown in FIG. 5, and the slits may be defined into various shapes and the domains may have various types.

Although not shown in the drawings, a lower alignment layer (not shown) may be disposed on the first to fourth pixel electrodes 180a to 180d. The lower alignment layer may include polyimide and the like, and be disposed on the whole surface of the display area in which the first to fourth pixel electrodes 180a to 180d are disposed.

The upper display plate 20 will now be described.

An upper substrate 190 may face the lower substrate 100. The upper substrate 190 may include transparent glass, plastic or the like, and as an exemplary embodiment, the upper substrate 190 may include a material same as that of the lower substrate 100.

The black matrix 200 may be disposed on the upper substrate 190 so as to prevent light from being transmitted to an area other than the pixel area. As an exemplary embodiment, the black matrix 200 may have a width wider than the width of the slit 171. The black matrix 200 may be disposed on the upper substrate 190 so as to correspond to the first to fourth switching elements TR1 to TR4, the first gate line GL1, the second gate line GL2, the first data line DL1 and the second data line DL2. As an exemplary embodiment, the black matrix 200 may include an organic material or a metallic material including chrome, for example.

A color filter 210 may be disposed on the black matrix 200 and the upper substrate 190. More specifically, the color filter 210 may be disposed on the upper substrate 190 corresponding to the pixel area defined by the black matrix 200. As an exemplary embodiment, the color filter 210 may represent any one of a red color (R), a green color (G) and a blue color (B) to be displayed, for example.

Although not shown in the drawings, an overcoating layer (not shown) and an upper alignment layer (not shown) may be disposed on the upper substrate 190. The overcoating layer may cover and planarize the color filter 210 and the black matrix 200.

Figure 8:
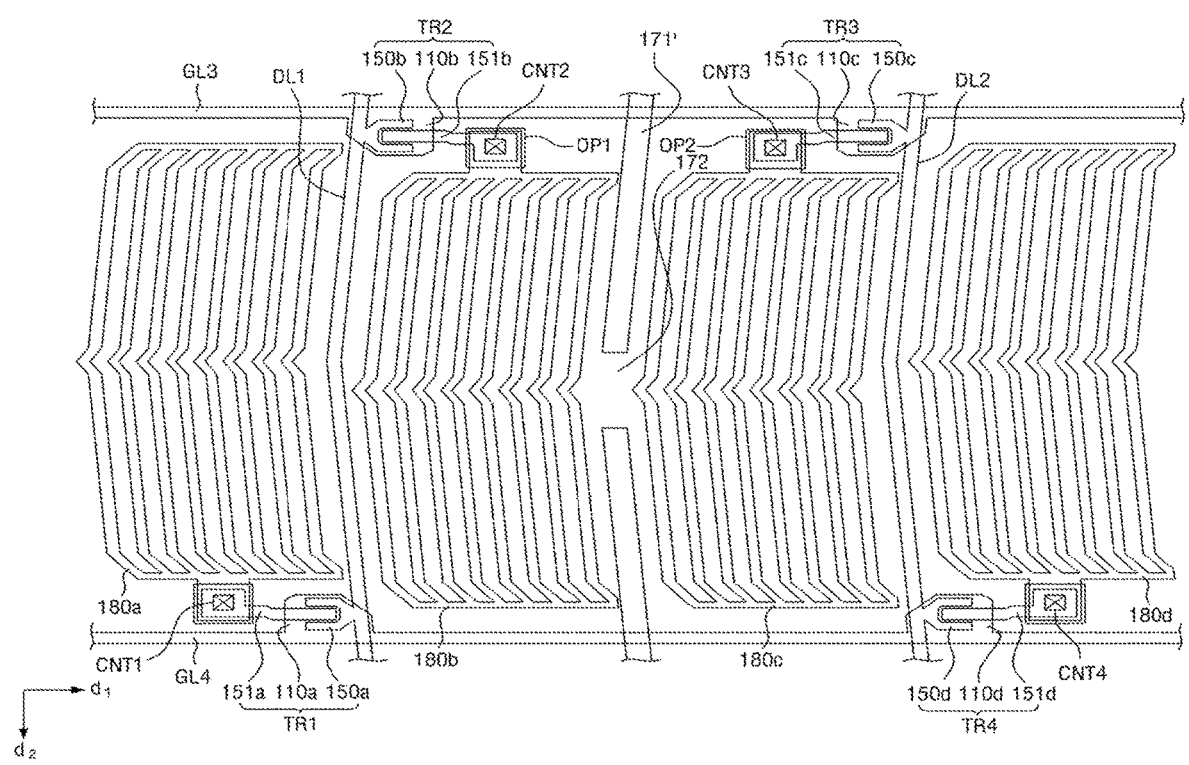
FIG. 8 is a plan view illustrating another exemplary embodiment of a slit shown in FIG. 5.
Figure 9:
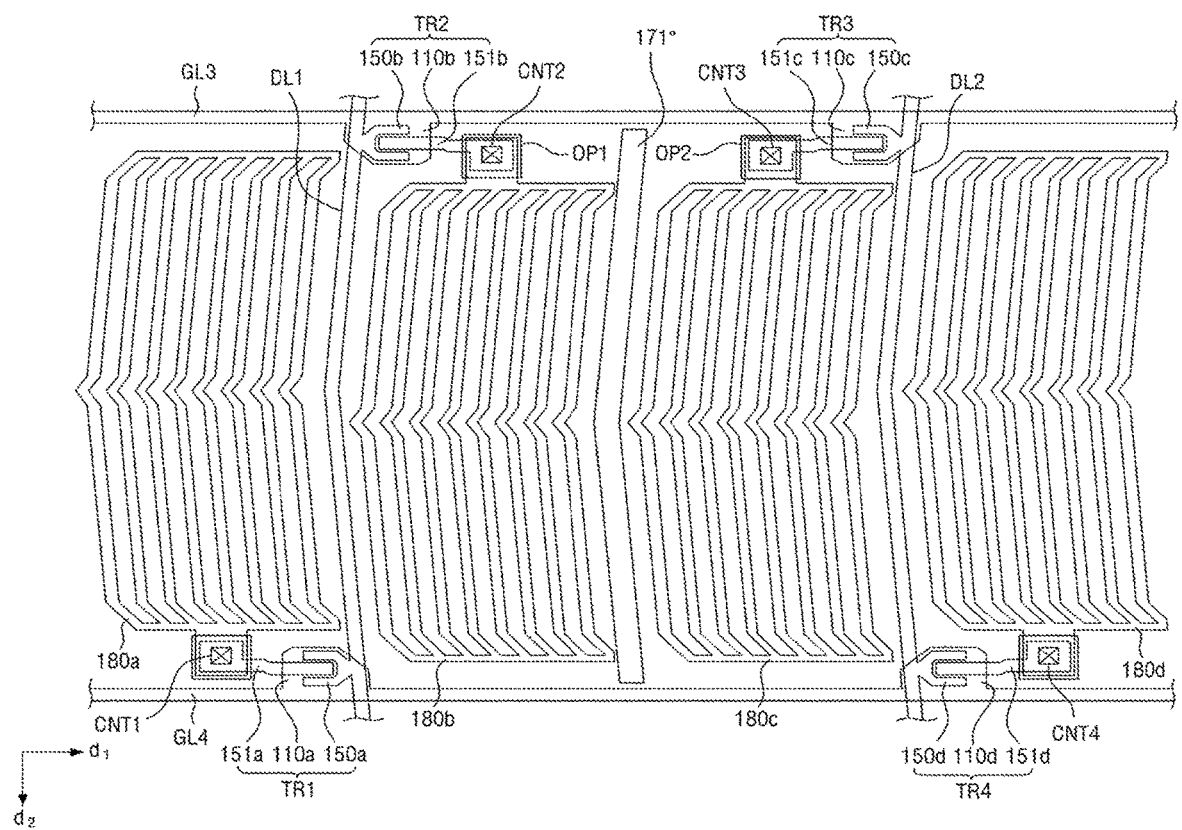
FIG. 9 is a plan view illustrating another exemplary embodiment of the slit shown in FIG. 5.
Figure 10:
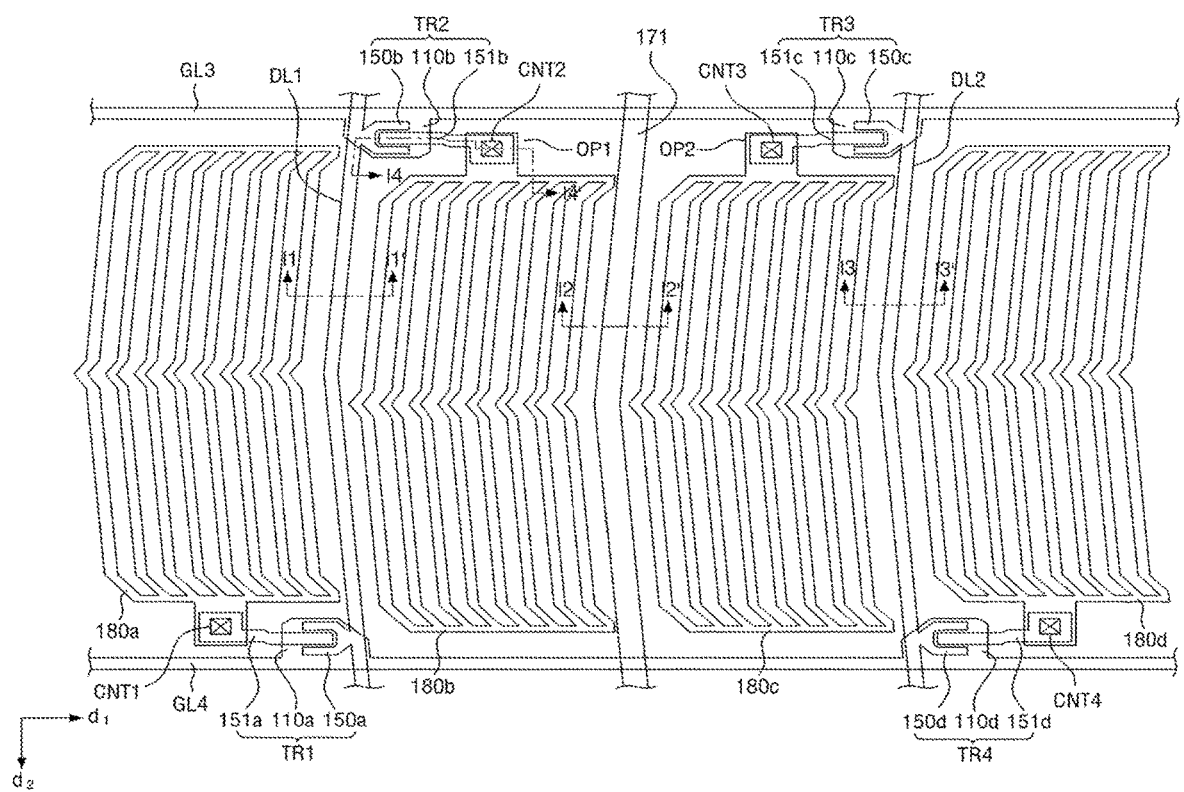
FIG. 10 is a plan view illustrating another exemplary embodiment of the slit shown in FIG. 5.

FIG. 8 is a plan view illustrating a slit 171' of another exemplary embodiment of the slit 171 shown in FIG. 5. FIG. 9 is a plan view illustrating a slit 171" of another exemplary embodiment of the slit 171 shown in FIG. 5. FIG. 10 is a plan view illustrating a slit 171 of another exemplary embodiment of the slit 171 shown in FIG. 5.

Referring to FIG. 8, the slit 171' may include two subslits. In this case, a region 172 between the subslits may be provided in a location similar to the location of the bent parts of the second and third pixel electrodes 180b and 180c. Furthermore, although the slit 171' having two subslits is depicted in FIG. 8, the invention is not necessarily limited thereto. When the slit 171' has a plurality of subslits, the subslits may have a shape, a size and a width which are not the same from one another.

Referring to FIG. 9, the slit 171" may be interposed between the first gate line GL1 and the second gate line GL2. That is, unlike those shown in FIG. 5, the slit 171" extending in the second direction d2 may not overlap the first gate line GL1 and the second gate line GL2 extending in the first direction d1.

Referring to FIG. 10, a plurality of island-shaped slits 171 may be defined in the common electrode 170. The shape, the size or the like of a unit slit forming the plurality of slits 171 are not limited to those shown in FIG. 10. Furthermore, the number of the slits 171 is not limited to those shown in FIG. 10.

Figure 11:
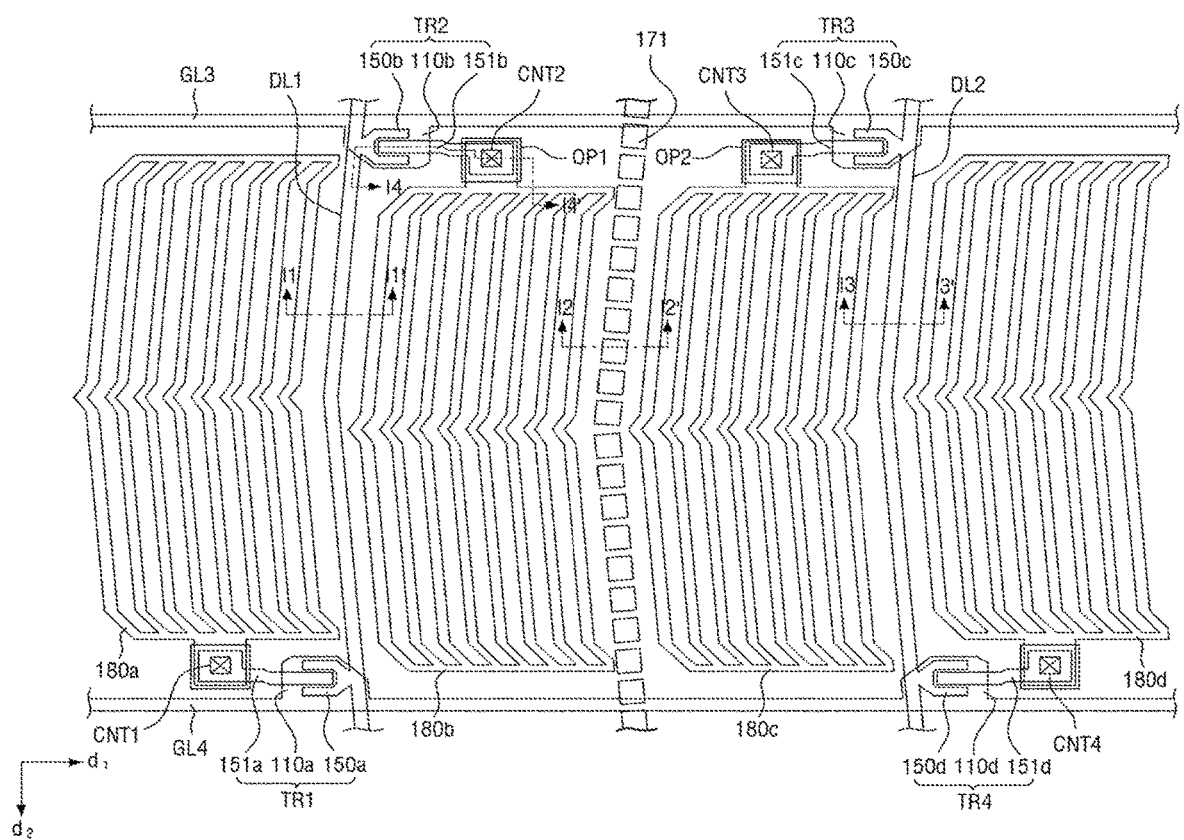
FIG. 11 is a plan view illustrating in detail another exemplary embodiment of first to fourth pixels of the display panel shown in FIG. 4.
Figure 12:
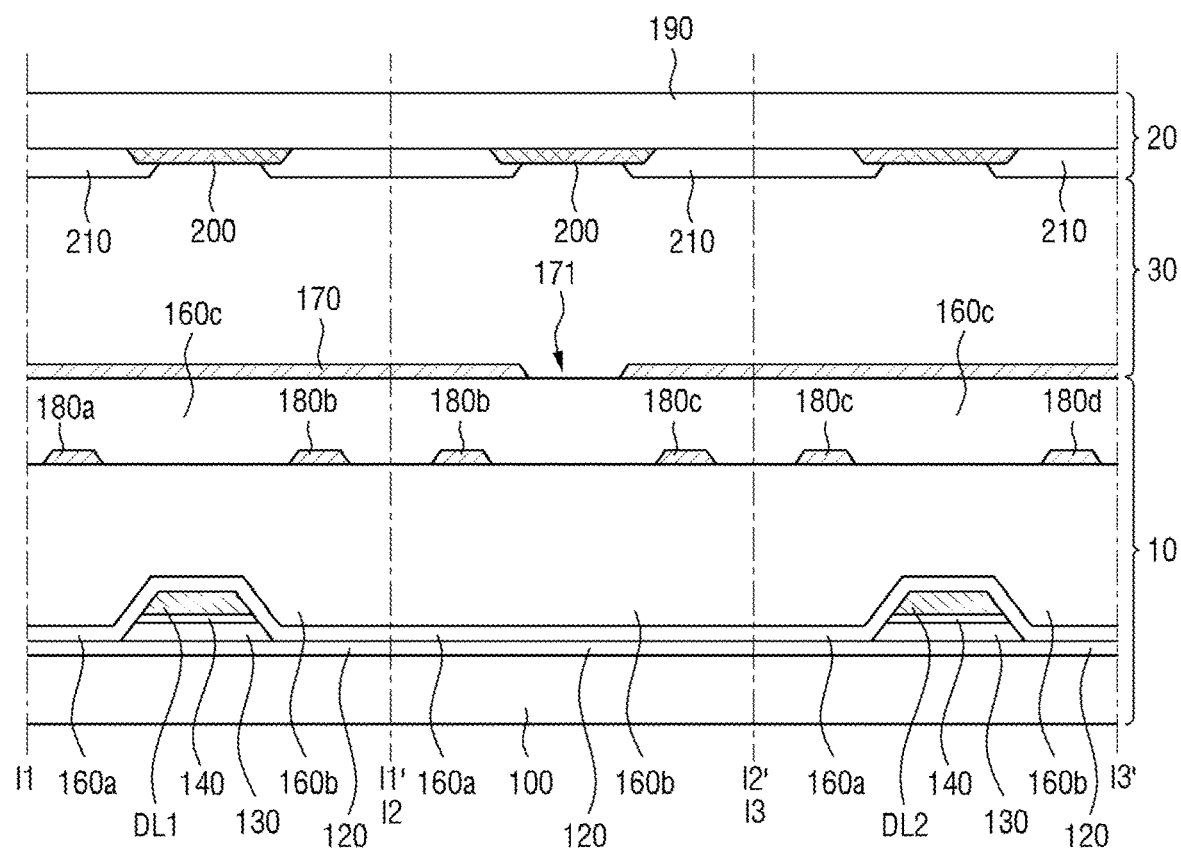
FIG. 12 is a cross sectional view taken along lines I1-I1', I2-I2' and I3-I3' of the plan view of FIG. 11.
Figure 13:
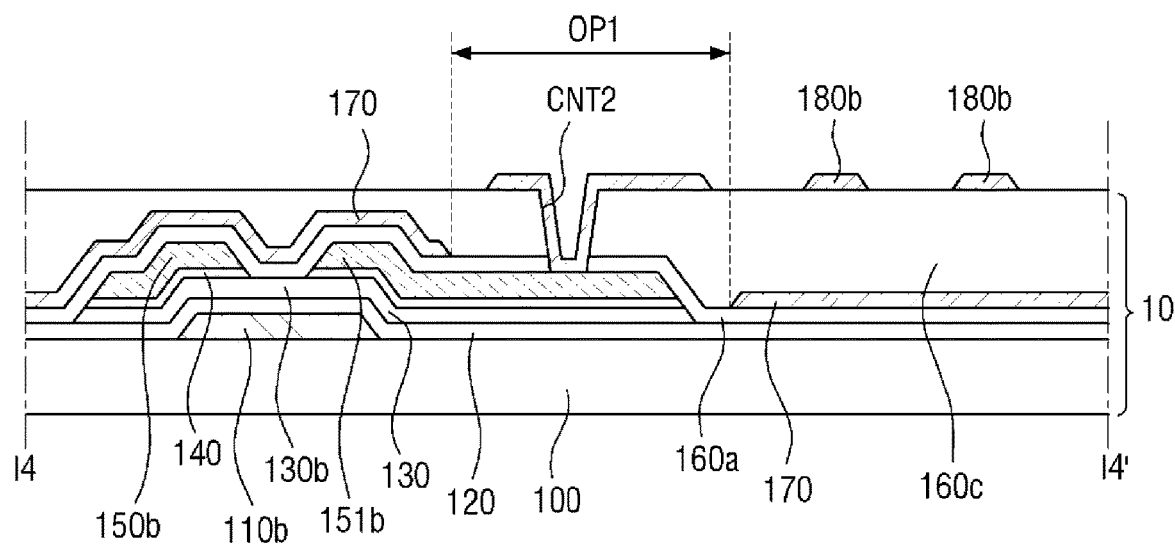
FIG. 13 is a cross sectional view taken along line I4-I4' of the plan view of FIG. 11.

FIG. 11 is a plan view illustrating in detail another exemplary embodiment of first to fourth pixels of the display panel shown in FIG. 4. FIG. 12 is a cross sectional view taken along lines I1-I1', I2-I2' and I3-I3' of the plan view of FIG. 11. FIG. 13 is a cross sectional view taken along line I4-I4' of the plan view of FIG. 11. However, duplicate description of the same content as those of the foregoing embodiment described with reference to FIGS. 5 to 7 will be omitted.

Referring to FIG. 4, and FIGS. 11 to 13, in the LCD device according to another exemplary embodiment of the invention, the common electrode 170 may be disposed on the first passivation layer 160a.

As described above, the first passivation layer 160a may include an inorganic insulation material such as silicon nitride, silicon oxide and the like. In an exemplary embodiment, the first passivation layer 160a may have a thickness of about 2000 angstroms (Å) to about 4000 Å in a cross-sectional direction, for example.

Subsequently, the second passivation layer 160c may be disposed on the common electrode 170. As an exemplary embodiment, a material of the second passivation layer 160c and a material of the first passivation layer 160a may be the same. That is, the LCD device according to another exemplary embodiment of the invention may not include the organic insulation layer 160b shown in FIG. 4. The upper surface of the second passivation layer 160c on which the first to fourth pixel electrodes 180a to 180d are disposed is depicted as being uniform in FIGS. 12 and 13 for convenience of explanation, but the invention is not limited thereto. That is, unlike those shown in FIGS. 12 and 13, the second passivation layer 160c may have a thickness similar to the thickness of the first passivation layer 160a.

That is, as an exemplary embodiment, each of the first passivation layer 160a and the second passivation layer 160c may be an inorganic layer having a thickness of about 2000 Å to 4000 Å, for example. Thus, the LCD device according to another exemplary embodiment of the invention shown in FIGS. 11 to 13 may not include an organic insulation layer having a thickness of about 3 micrometers (μm) to about 4 μm, for example. This eliminates the necessity of forming a separate organic insulation layer, thereby simplifying manufacturing process and providing advantages in terms of cost.

The first to fourth pixel electrodes 180a to 180d may be disposed on the second passivation layer 160c. Thus, the second contact hole CNT2 may electrically interconnect the exposed part of the second drain electrode 151b and the second pixel electrode 180b. The first, third and fourth contact holes CNT1, CNT3 and CNT4 may be substantially similar to the second contact hole CNT2, and thereby a detailed description will be omitted.

This will be described in detail with reference to FIGS. 14 to 16.

Figure 14:
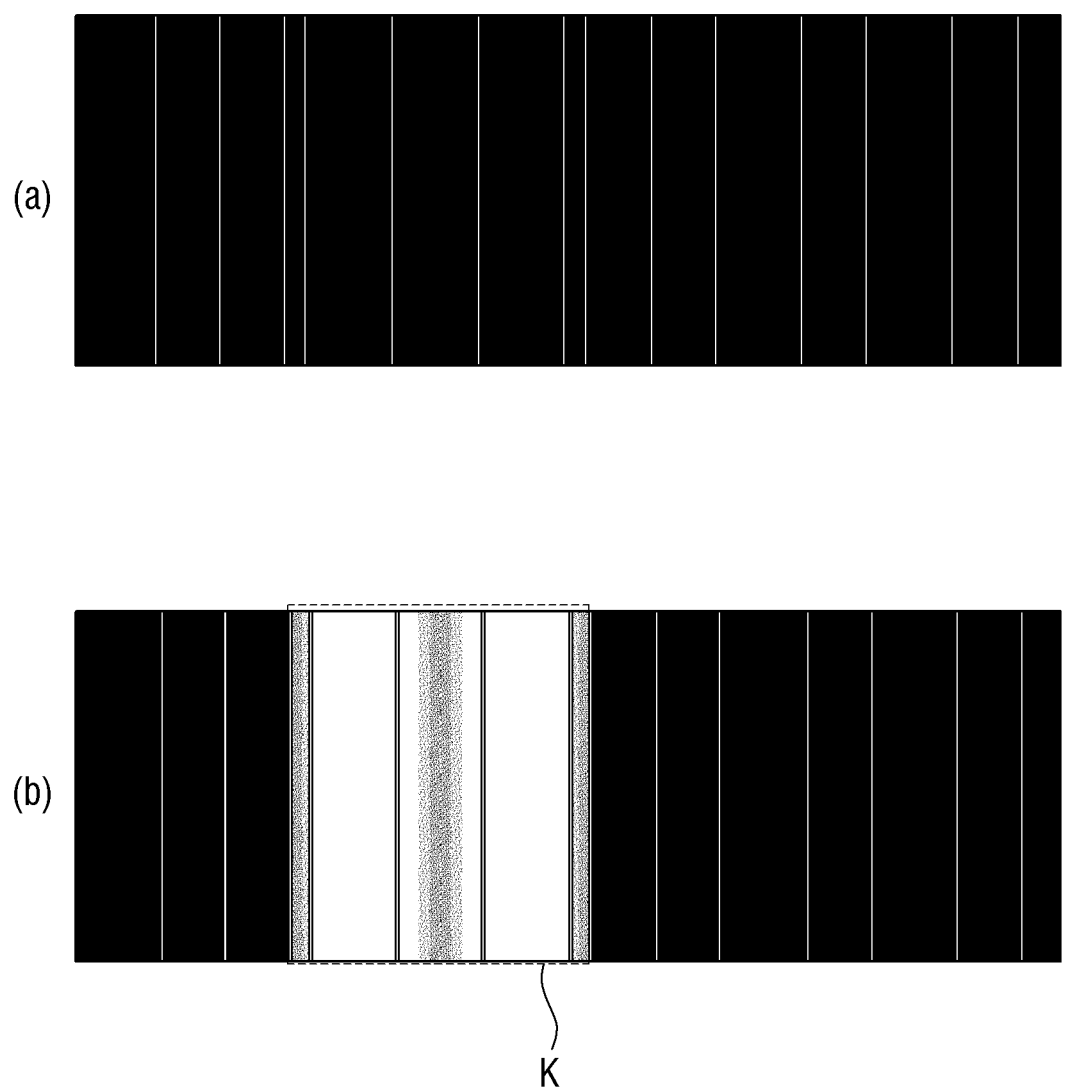
FIG. 14 illustrates the degree of light leakage when a common electrode is disposed on data lines (a), and the degree of light leakage when no common electrode is disposed on the data lines (b)

FIG. 14 illustrates the degree of light leakage when a common electrode is disposed on data lines (a), and the degree of light leakage when no common electrode is disposed on the data lines (b).

Referring to FIG. 14, the light leakage when no common electrode is disposed on the data lines (b) is more than the light leakage when a common electrode is disposed on data lines (a). When no common electrode is disposed on the data line and thus the data line and the common electrode do not overlap each other, the data line and a pixel electrode are coupled through a non-overlapping region K, thereby generating a fringe field between the data line and the pixel electrode, and the fringe field causes light leakage. Furthermore, as light leakage increases, color mixture defects may also increase. When a spacing distance between pixel electrodes is decreased to improve transmittance, color mixture characteristics may be degraded.

Thus, in the LCD device according an exemplary embodiment of the invention, at least one slit 171 may be defined in the common electrode 170, which may be necessarily formed in a region non-overlapping the data line so as to prevent the light leakage described above. Thus, the light leakage caused by a fringe field can be prevented.

Figure 15:
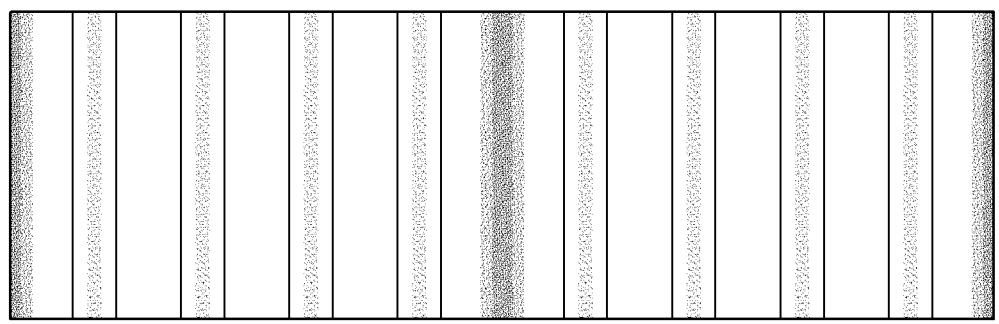
FIGS. 15 and 16 comparatively illustrate an exemplary embodiment of the invention and conventional techniques of the transmittance and color mixture defects of the LCD devices.
Figure 15:
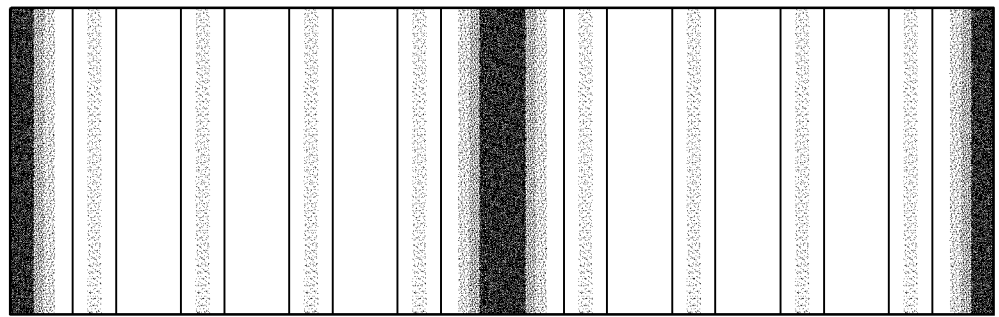
Figure 16:
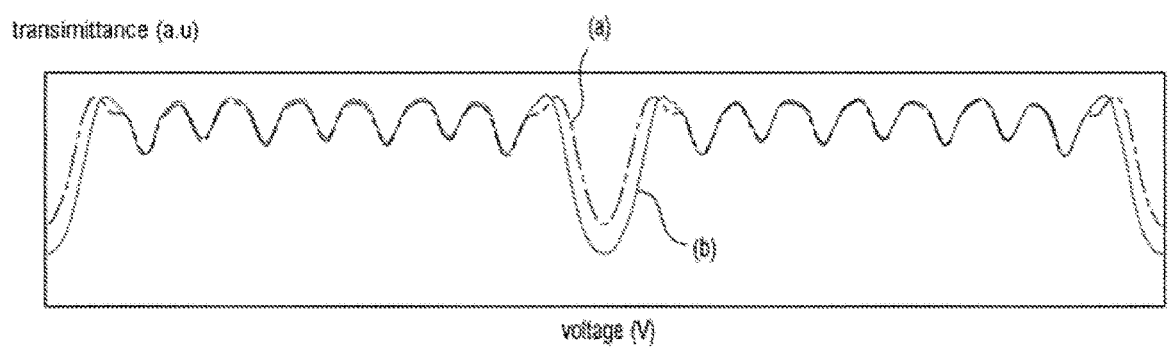

FIGS. 15 and 16 comparatively illustrate the transmittance and color mixture defects of the LCD devices according to an exemplary embodiment of the invention and conventional techniques, respectively.

Referring to FIG. 15, a space between pixel units is darker in the LCD device according to an exemplary embodiment of the invention (b) than in the LCD device according to conventional techniques (a). That is, the LCD device according to an exemplary embodiment of the invention (b) has less light leakage, which means that the LCD device according to an exemplary embodiment of the invention (b) is relatively more excellent in color mixture characteristics.

More specifically, referring to table 1 below, since at least one slit 171 is defined in the common electrode 170, excellent color mixture characteristics may be achieved even when a spacing distance between pixel electrodes is decreased. The decreased spacing distance may result in improved transmittance.

TABLE 1

| | Spacing distance 15.2 μm (Conventional technique) | Spacing distance 8.2 μm (Conventional technique) | Spacing distance 8.2 μm (Exemplary embodiment) |
|---|---|---|---|
| Transmittance | 22.8% | 24.9% | 25.1% |

Figure 17:
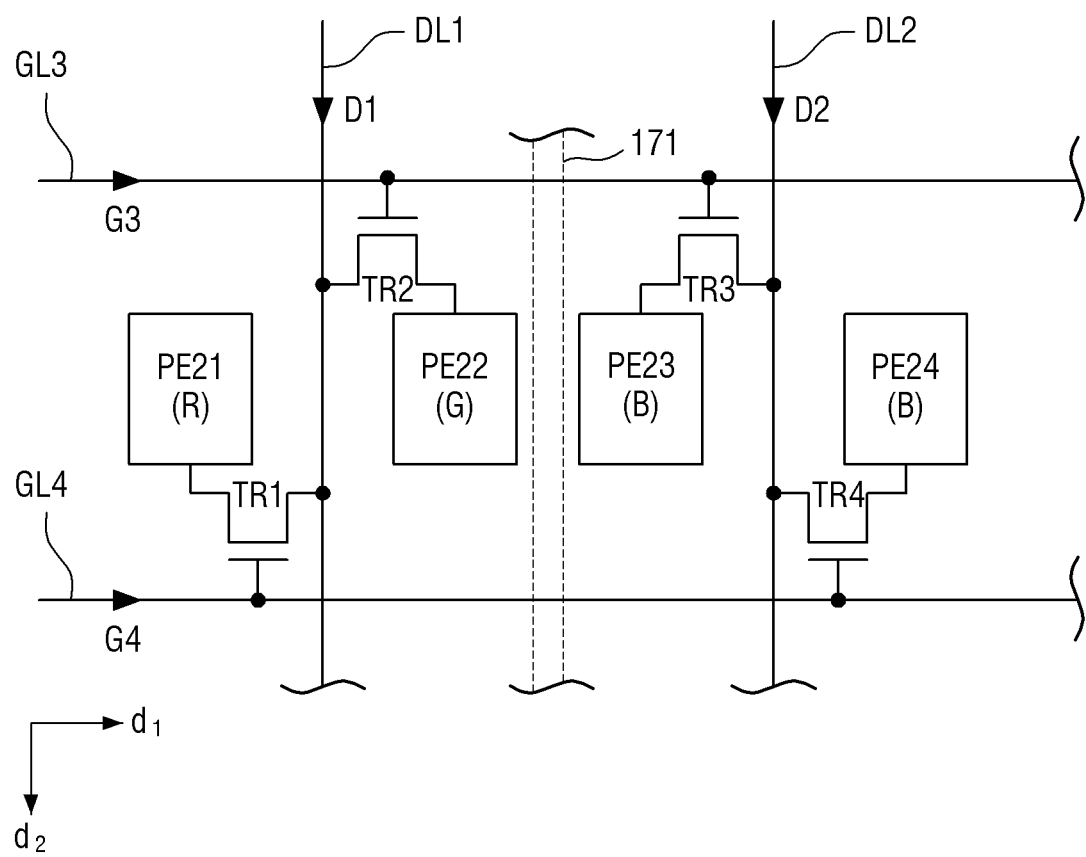
FIGS. 17 and 18 illustrate an exemplary embodiment of an arrangement of pixel electrodes of the LCD device according to the invention.
Figure 18:
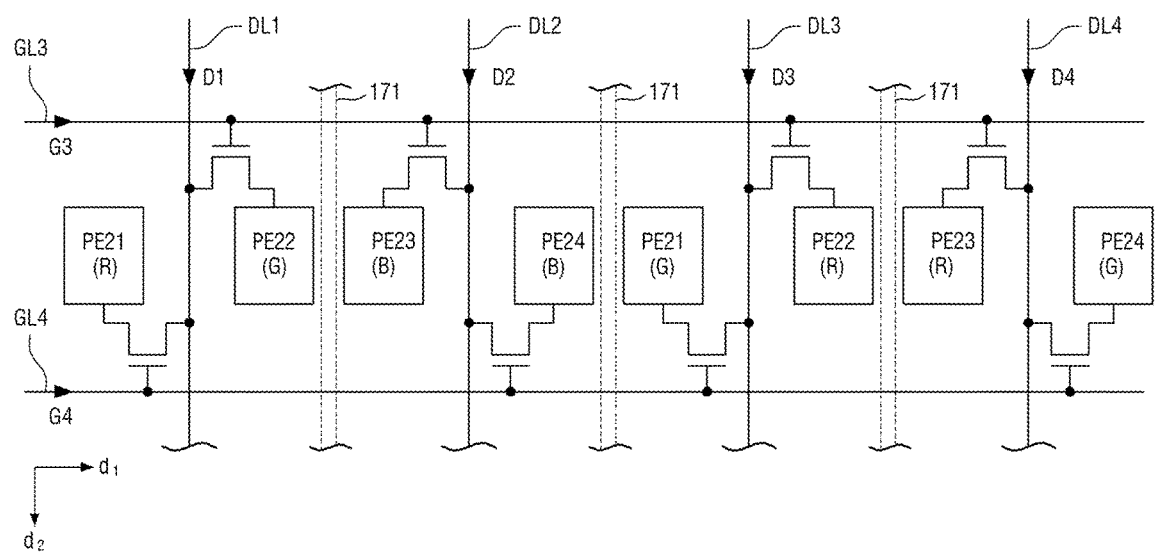

FIGS. 17 and 18 illustrate an arrangement of pixel electrodes of the LCD device according to an exemplary embodiment of the invention.

Referring to FIGS. 5 and 17, the first pixel electrode PE21 may represent a red color (R) to be displayed, and the second pixel electrode PE22 may represent a green color (G) to be displayed. Furthermore, the third and fourth pixel electrodes PE23 and PE24 may represent a blue color (B) to be displayed. Thus, as an exemplary embodiment, at least one slit 171 of the common electrode 170 may be interposed between the second pixel electrode PE22 representing the green color (G) to be displayed and the third pixel electrode PE23 representing the blue color (B) to be displayed.

As described above, the decreased spacing distance between pixel electrodes may cause color mixture defects. In this case, the color mixture defects may become most serious between the green color (G) and the blue color (B).

Therefore, at least one slit 171 interposed between the green color (G) and the blue color (B). may be defined in the LCD device according to an exemplary embodiment of the invention To this end, in the LCD device according to an exemplary embodiment of the invention, pixel electrodes may be arranged at a cycle of (R)-(G)-(B)—(B)-(G)-(R), as shown in FIG. 18. Referring to FIG. 18, the slit 171 of the common electrode 170 may be provided in a region in which no data line is disposed, that is, the slit 171 may be interposed between the second pixel electrode PE22 and the third pixel electrode PE23 and between the fourth pixel electrode PE24 and the fifth pixel electrode PE25, for example. In this case, the second to fifth pixel electrodes PE22 to PE25 may respectively represent the colors of (G)-(B)-(B)-G) to be displayed, thereby maximizing the degree of improvement in color mixture defects.

Although certain exemplary embodiments and implementations are described herein, other exemplary embodiments and modifications will be apparent from this description. Accordingly, the invention is not limited to such exemplary embodiments, but rather to the broader scope of the presented claims and various obvious modifications and equivalent arrangements.

What is claimed is:

1. A liquid crystal display device, comprising:
   first to fourth pixel electrodes neighboring each other in a first direction;
   a first data line and a second data line extended in a second direction different from the first direction, and neighboring each other; and
   a common electrode at least partially overlapping the first data line, the second data line, and the first to fourth pixel electrodes,
   wherein the first data line is interposed between the first pixel electrode and the second pixel electrode, and the second data line is interposed between the third pixel electrode and the fourth pixel electrode,
   and at least one slit is defined in the common electrode and interposed between the second pixel electrode and the third pixel electrode, and
   wherein any portion of the at least one slit does not overlap the second pixel electrode, the third pixel electrode, the first data line and the second data line.

2. The liquid crystal display device of claim 1, wherein the at least one slit is separated from the first data line and the second data line in a plan view.

3. The liquid crystal display device of claim 1, wherein the at least one slit is defined in parallel to the first data line and the second data line.

4. The liquid crystal display device of claim 1, wherein the at least one slit and the first data line and the second data line are bent.

5. The liquid crystal display device of claim 1, wherein the second pixel electrode represents a green color to be displayed, and the third pixel electrode represents a blue color to be displayed.

6. The liquid crystal display device of claim 1, wherein data signals having different polarities are applied respectively to the first data line and the second data line.

7. The liquid crystal display device of claim 1, wherein the at least one slit extending in the second direction is defined in each group consisting of the first to fourth pixel electrodes of a plurality of groups of the first to fourth pixel electrodes.

8. The liquid crystal display device of claim 1, wherein the first electrode, the second electrode, the third electrode and the fourth electrode fully overlap with the common electrode.

9. The liquid crystal display device of claim 1, further comprising a first gate line and a second gate line extended in the first direction and neighboring each other,
   wherein the first to fourth pixel electrodes are interposed between the first gate line and the second gate line.

10. The liquid crystal display device of claim 9, further comprising:
    a first switching element including a first gate electrode connected to the first gate line, one first electrode connected to the first data line, and a first another electrode connected to the first pixel electrode;
    a second switching element including a second gate electrode connected to the second gate line, one second electrode connected to the first data line, and a second another electrode connected to the second pixel electrode;
    a third switching element including a third gate electrode connected to the second gate line, one third electrode connected to the second data line, and a third another electrode connected to the third pixel electrode; and
    a fourth switching element including a fourth gate electrode connected to the first gate line, one fourth electrode connected to the second data line, and a fourth another electrode connected to the fourth pixel electrode.

11. The liquid crystal display device of claim 9, further comprising:
    a first switching element including a first gate electrode connected to the first gate line, one first electrode connected to the first data line, and a first another electrode connected to the first pixel electrode;
    a second switching element including a second gate electrode connected to the second gate line, one second electrode connected to the first data line, and a second another electrode connected to the second pixel electrode;
    a third switching element including a third gate electrode connected to the first gate line, one third electrode connected to the second data line, and a third another electrode connected to the third pixel electrode; and a fourth switching element including a fourth gate electrode connected to the second gate line, one fourth electrode connected to the second data line, and a fourth another electrode connected to the fourth pixel electrode.

12. The liquid crystal display device of claim 9, wherein the at least one slit is interposed between the first gate line and the second gate line.

13. A liquid crystal display device, comprising:
a first data line and a second data line neighboring each other on a lower substrate;
first to fourth pixel electrodes neighboring each other on the lower substrate and connected to either the first data line or the second date line; and
a common electrode which at least partially overlaps the first data line, the second data line, and the first to fourth pixel electrodes, and in which at least one slit is defined,
wherein the first data line overlaps a first region between the first pixel electrode and the second pixel electrode, and the second data line overlaps a second region between the third pixel electrode and the fourth pixel electrode,
and the at least one slit overlaps a third region between the second pixel electrode and the third pixel electrode, and
wherein any portion of the at least one slit does not overlap the second pixel electrode, the third pixel electrode, the first data line and the second data line.

14. The liquid crystal display device of claim 13, wherein the at least one slit has a width wider than each of widths of the first and second data lines.

15. The liquid crystal display device of claim 13, wherein the second pixel electrode represents a green color to be displayed, and the third pixel electrode represents a blue color to be displayed.

16. The liquid crystal display device of claim 13, further comprising:
an upper substrate facing the lower substrate; and
a black matrix disposed on the upper substrate so as to at least partially overlap the third region.

17. The liquid crystal display device of claim 13, further comprising:
a first insulation layer interposed between the first and second data lines and the common electrode; and
a second insulation layer interposed between the common electrode and the first to fourth pixel electrodes,
wherein the first to fourth pixel electrodes are disposed on the second insulation layer.

18. The liquid crystal display device of claim 17, wherein the second insulation layer includes an inorganic material.

19. The liquid crystal display device of claim 17, further comprising an organic insulation layer interposed between the first insulation layer and the second insulation layer.

20. A liquid crystal display device, comprising:
first to fourth pixel electrodes neighboring each other in a first direction;
at least one slit defined in a common electrode and interposed between the second pixel electrode and the third pixel electrode; and
a first data line and a second data line extended in a second direction different from the first direction, disposed adjacent to each other, and at least partially overlapped by the common electrode,
wherein the first data line is interposed between the first pixel electrode and the second pixel electrode and connected respectively to the first pixel electrode and the second pixel electrode, and the second data line is interposed between the third pixel electrode and the fourth pixel electrode and connected respectively to the third pixel electrode and the fourth pixel electrode,
and neither the first data line nor the second data line is disposed between the second pixel electrode and the third pixel electrode, and
wherein any portion of the at least one slit does not overlap the second pixel electrode, the third pixel electrode, the first data line and the second data line.

21. The liquid crystal display device of claim 20, wherein the second pixel electrode represents a green color to be displayed, and the third pixel electrode represents a blue color to be displayed.

22. The liquid crystal display device of claim 20, wherein the common electrode is interposed between the first and second data lines and the first to fourth pixel electrodes.

23. The liquid crystal display device of claim 20, further comprising a first gate line and a second gate line extended in the first direction, and disposed adjacent to each other,
wherein the first to fourth pixel electrodes are interposed between the first gate line and the second gate line.

24. The liquid crystal display device of claim 23, wherein the first gate line is electrically connected to the first and fourth pixel electrodes, and the second gate line is electrically connected to the second and third pixel electrodes.

25. The liquid crystal display device of claim 23, wherein the at least one slit is interposed between the first gate line and the second gate line.

* * * * *